United States Patent [19]
Wendling et al.

[11] 4,320,723
[45] Mar. 23, 1982

[54] SELECTIVELY OPERABLE FAN DRIVE ARRANGEMENT

[76] Inventors: Vincent F. Wendling, 7533 Mt. Hood Blvd.; Frank K. Mattson, 7575 Mt. Hood Blvd., both of Dayton, Ohio 45424

[21] Appl. No.: 47,087

[22] Filed: Jun. 11, 1979

[51] Int. Cl.³ ............................................. F01P 7/02
[52] U.S. Cl. .............................. 123/41.12; 123/41.49; 192/58 B; 192/114 R
[58] Field of Search ............... 123/41.11, 41.12, 41.49, 123/41.65; 192/58 B, 114 R; 64/4

[56] References Cited

U.S. PATENT DOCUMENTS

| | | | |
|---|---|---|---|
| 666,511 | 1/1901 | Furbish | 64/4 |
| 2,497,893 | 2/1950 | Linahan | 192/114 R |
| 3,943,893 | 3/1976 | Tsubaki et al. | 123/41.12 |
| 4,119,184 | 10/1978 | Mower et al. | 123/41.12 |

*Primary Examiner*—Craig R. Feinberg
*Assistant Examiner*—W. R. Wolfe

[57] ABSTRACT

A fan clutch lock for temporarily forcing the cooling fan associated with an internal combustion engine to turn without slippage, comprising a shaft member adapted to be driven in rotation by the engine. Mounting means are provided for mounting a fan to be turned by the shaft, with the mounting means involving a clutch arranged normally to permit a controlled amount of fan slippage as generally regulated by the engine operating temperature, with an increased amount of fan slippage ordinarily occurring at higher engine operating speeds. A novel locking means provided in accordance with this invention enables the fan clutch to be selectively circumvented such that upon operation of said locking means, the fan is required to rotate at the same speed as said shaft member at all engine operating speeds, thus enhancing the cooling capacity of the fan. This additional cooling is particularly desirable when the engine is heavily loaded.

14 Claims, 16 Drawing Figures

SELECTIVELY OPERABLE FAN DRIVE ARRANGEMENT

BACKGROUND OF INVENTION

For many years it has been known in the automotive arts to provide some form of temperature-responsive actuating device for the fan employed in the liquid cooling type of heat exchanging system. The temperature responsive control is provided to reduce the overall cost of operating the system by operating the fan only intermittently or at reduced speeds when the engine is operating at high speed, thus to reduce air flow at times when the operating temperature of the engine does not warrant the full cooling effect of the fan. By way of comparison, a direct drive fan uses 5% to 8% more fuel than the same engine equipped with a temperature responsive fan.

With the increasing number of power consuming accessories used in conjunction with automotive internal combustion engines it becomes even more necessary to conserve power and to drive the engine cooling fan only to the extent necessary at times when the coolant temperature, or some other aspect of engine performance requires it. It is to be realized that the cooling fan can require a considerable amount of power and it is accordingly advantageous to minimize fan speed when its full operation is no longer required, which also serves to minimize the objectable noise associated with high fan speed. Further, uncoupling the cooling fan at comparatively low engine temperatures serves to speed up the warmup of the engine.

Many commercially employed temperature-responsive engine cooling fans are not directly responsive to the temperature of the liquid coolant of the engine. Rather, they are often directly responsive to the temperature of the air that circulates through the radiator. In many instances such air temperature does not give a true indication of the coolant temperature. Although devices have been proposed that are directly responsive to the coolant temperature, these devices are often complicated and costly to produce.

A great number of temperature-responsive fan drives embody some form of element that has thermal properties for actuating the drive. Examples of such elements are bimetallic springs, metals having high coefficients of thermal expansion and wax pellets. Certain of these devices deteriorate with age or their thermal properties may change with age. In addition, in the case of engine cooling systems, a change in engine coolant may make it desirable to operate at high or lower temperatures. It is thus sometimes necessary to replace the temperature-responsive element in these instances.

Examples of prior art temperature-responsive fan devices are U.S. Pat. No. 3,262,528 to Weir (employing a silicone fluid-shear coupling and a bimetallic strip), U.S. Pat. No. Re. 24,157 to Johnson (employing an expandibile fluid and a bellows), U.S. Pat. No. 3,180,571 to Caroli (employing a bellows), and U.S. Pat. No. 3,228,382 to Stefan (employing a venturi throat and a coolant in the vapor phase acting against a fan clutch device.)

Although there is obviously a great deal of justification for the use of a clutch drive fan, a problem arises in a vehicle thus equipped when the vehicle owner wants to pull a travel trailer, utility trailer, boat or horse trailer or the like, or when light duty trucks are heavily loaded. This is because the slippage of the fan will be such that insufficient amount of cooling air is directed across the radiator and engine so as to keep it at the proper operating temperature. This situation is a prime cause of engine overheating and it becomes aggravated by hilly or mountinous roads. High ambient summer temperatures further complicate the situation, and may well force the vehicle owner to seriously consider the physical exchange of a temperature responsive fan for a fixed drive fan so that he can continue to use his vehicle to pull the trailer or carry the load.

It was as a result of this type of problem that the present invention was evolved, and by virtue of this invention, newly-manufactured vehicles equipped with a temperature-responsive clutch fan can now be equipped with a selectively operable clutch fan locking device such that optimum fan operation for a given set of operating conditions can easily be obtained.

SUMMARY OF THE INVENTION

In accordance with this invention, we provide a novel fan clutch lock arrangement for temporarily forcing the clutch fan associated with cooling an internal combustion engine to turn without slipping, and this entails in the preferred embodiment a locking means in the form of a modification to existing designs of the clutch housing and fan clutch drive shaft. Such locking means may take the form of a novel device formed by a boss on the clutch housing that is designed to accommodate a spring loaded radially slidable locking pin that engages a companion mating hole in the fan drive shaft. Thus, when the pin is engaged with the shaft, the fan operates in a one to one relationship with the fan drive shaft, whereas when the locking pin is disengaged, the fan operates in its temperature responsive mode.

Ordinarily, our clutch locking pin forms no connection between the fan clutch housing and the fan drive shaft, but on the occasion of anticipated engine overheating conditions due to a load to be carried or drawn by the vehicle, the vehicle owner can by a simple manipulation of the locking pin, cause the fan clutch arrangement to be circumvented, thus to force the fan to turn at a one on one ratio with the fan drive shaft, which is of course the highest possible speed, thus providing the maximum cooling effect.

Restoration of the fan clutch to its original operating condition may easily be brought about by disengaging the clutch locking pin when the vehicle is no longer to be used in the heavily loaded condition. The preferred embodiment of our novel fan clutch lock involves a modification to existing designs to provide the novel structure and the locking means to couple the fan clutch housing to the fan drive shaft. Other embodiments can take a number of forms to accomodate a retrofit for existing vehicles, with the particular version utilized in a given instance being determined by the clutch fan arrangement utilized in the vehicle. This may entail a locking means in the form of a bracket or like device carried on the belt-driven shaft member supporting the fan assembly, or carried by the clutch housing of the clutch fan. Ordinarily our bracket forms no connection between the supporting shaft and the clutch of the fan, but on occasion of anticipated engine overheating conditions due to a load being carried by or drawn by the vehicle, the vehicle owner can by a simple manipulation of the bracket, cause the fan clutch arrangement to be circumvented, thus to force the fan to turn at a one to one ratio with the fan drive shaft.

Restoration of the fan clutch to its original operating condition may in latter instance be easily brought about by removing or disabling the bracket when the vehicle is no longer in the heavily loaded condition.

It is therefore a principal object of this invention to provide a low cost yet highly satisfactory means for enabling the owner of a vehicle equipped with a fan clutch arrangement to easily circumvent the fan clutch so that the maximum engine cooling effect can be brought about when needed.

DETAILED DESCRIPTION

Figure 1:
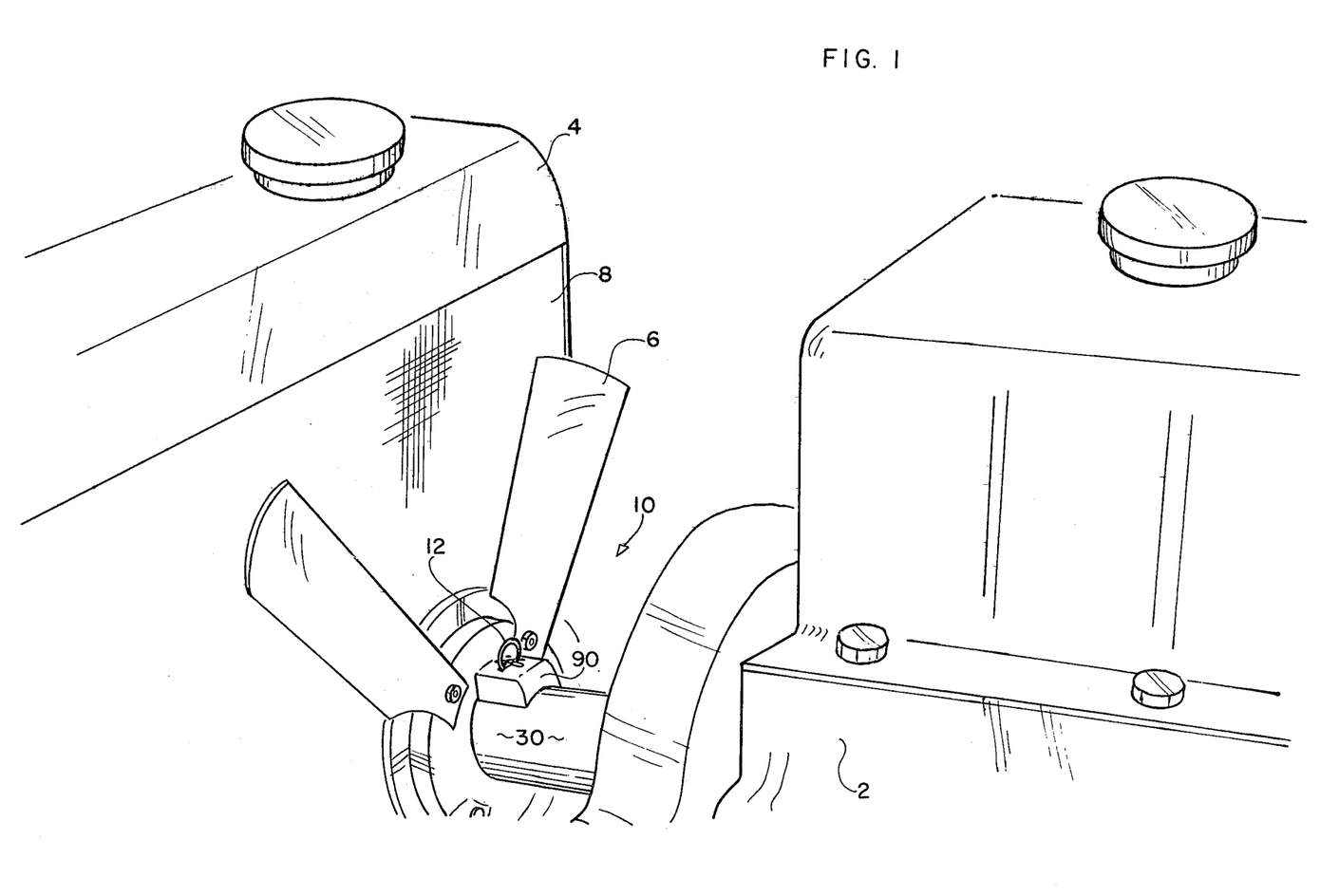
FIG. 1 is a perspective, fragmentary view of the upper front portion of an automobile or truck engine, with this view revealing a more or less conventional bladed cooling fan turned by the engine, as well as a novel means in accordance with this invention whereby any slippage of the fan during periods of heavy pulling efforts by the engine can be selectively eliminated.

Turning to FIG. 1, it will be seen that we have there shown an under-the-hood view of an automobile or truck in which a fragmentary portion of the forward part of an engine 2 is depicted. Between a front portion of the engine and the radiator 4 is located multibladed fan 6, which is driven in rotation by the engine, and which serves to draw air through the finned portion 8 of the radiator 4, thus to aid the cooling of the liquid caused to circulate through the engine and the radiator tubing by the efforts of the water pump (not shown).

As will be described at length hereinafter, we utilize a novel fan clutch lock arrangement 10 in accordance with this invention, such that on the occasion of using the vehicle for towing or heaving hauling over hilly roads, for example, the fan 6 can be caused to turn without the customary slippage, thus to maximize the cooling efforts of the fan. In the embodiment depicted in FIG. 1, we control the activation of the clutch lock arrangement by the use of a ring 12, which the driver normally engages with his thumb and forefinger in order to control the positioning thereof, and thus determine the activation or deactivation of the fan clutch arrangement. Further details pertinent to the fan clutch lock will be made more apparent as the description proceeds.

Figure 2:
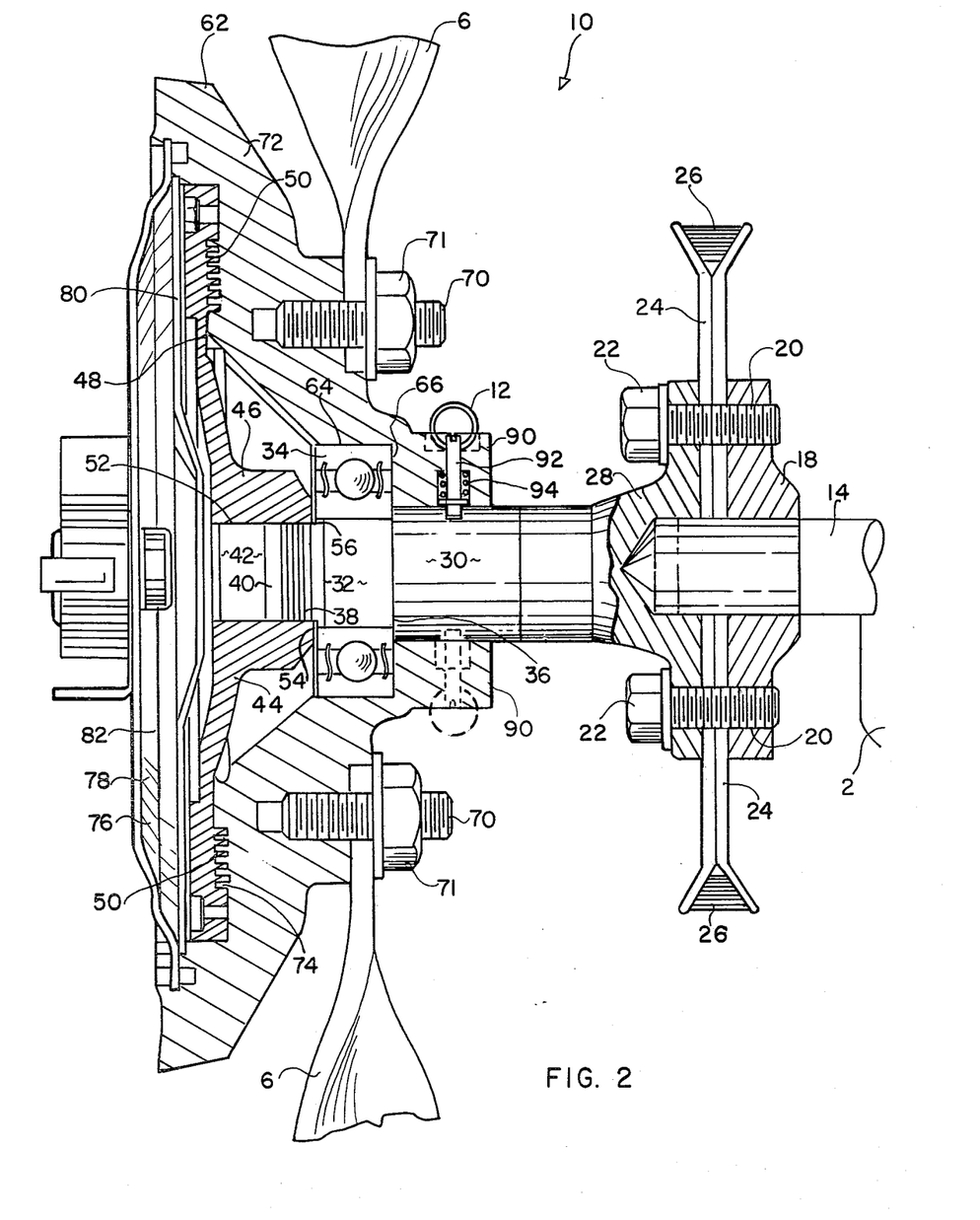
FIG. 2 is a cross sectional view to a larger scale, revealing the use of a pair of permanently mounted bosses, and one or two pins that are radially slidable in the bosses, such that any slippage tending to occur between the fan driving shaft and the fan can be selectively eliminated when the pins are in their radially inward positions.

Turning now to FIG. 2, we have there shown a cross-sectional view of a first embodiment of a fan clutch lock arrangement in accordance with this invention, with the depicted components being operatively supported from a stub mounting shaft 14 extending outwardly from the engine 2. Mounted upon the outer end of the shaft 14 by a force or press fit is a companion plate 18, which is provided with a number of tapped holes 20 in a circular array, disposed at equal intervals. The portion of the shaft 14 extending into the engine is normally associated with the water pump.

The hub plate 18 forms the support for pulley 24 driven by a belt 26 from the vehicle engine, so that when the engine is in operation, the pulley functions as a driving input means for the fan clutch or engine accessory fluid coupling means.

Attached by bolts 22 to the hub plate 18 is the hub or flange portion 28 of the fan drive shaft 30 with this shaft being directly responsible for supporting as well as for driving the clutch driving member 44 and the fan 6 in rotation through the fluid shear as described later.

The fan drive shaft 30 is provided with a reduced intermediate portion 32 which functions as an inner race supporting means for ball bearing assembly 34. A shoulder 36 formed on fan drive shaft 30 restrains the ball bearing 34 in one axial direction. A further shaft portion 38 is provided with surface serrations and a reduced diameter shaft portion 40 connects a further shaft portion 42 to the aforementioned portion of fan drive shaft 30.

A coupling member or clutch driving member 44 is provided with a hub portion 46 and a flange or plate portion 48 having a plurality of concentric, annular coupling lands 50 formed on the backside of flanged portion 48.

Hub portion 46 is provided with a straight wall hub opening 52 which has an interference fit with shaft portion 42 and knurled portion 38 so that when hub portion 46 is pressed or forced on the shaft portions 38 and 42, clutch driving member 44 will rotate with and be axially retained on fan drive shaft 30.

Hub portion 46 is pressed onto the shaft and bearing assembly until thrust surface portion 54 of the hub portion 46 abuts the inner race of bearing assembly 34 to axially confine the bearing assembly in the other direction of axial movement. Fan drive shaft 30 is undercut at 56 to ensure abutment between the thrust surface 54 of hub 46 and the end surface of the inner race of the bearing assembly 34.

A coupling body or housing member 62 is comprised of a hub surface portion 64 supported on the lateral surface portion of the outer race of ball bearing assembly 34 and disposed in an interference fit therewith. A lip or shoulder portion 66 reacts against an end surface of the outer race of bearing assembly 34 and limits or actually restrains housing member 62 in one axial direction. A plurality of blades constituting fan 6 are secured at their shank portions by stud assemblies 70 to intermediate body portion 72 of housing member 62. A nut 71 is utilized on each stud 70.

A plurality of concentric annular lands 74 are disposed in an axial direction and formed integral with coupling body member 62, and, in assembly, are positioned in an axially overlapping relationship with annular coupling lands 50 of driving clutch member 44 so that the grooves disposed between the lands of one of the members receive the lands of the other member to form a fluid operating chamber between the lands. The aforementioned coupling grooves are disposed in a position so that when oil or other viscous fluid means, or more specifically, silicone oil is disposed between the lands 50 and 74, torque can be transmitted from one member to the other by fluid shear. It has been found satisfactory to provide a radial clearance between lands 50 and 74 in a range of about 0.005 to 0.010 inch. However, this clearance is not extremely critical and is a function of the inherent characteristics of the fluid utilized. The peripheral surface of driving member 44 is slightly radially spaced from the adjacent wall surface of housing member 62. During operation, housing member 62 is supported by bearing assembly 34 and fluid in the operating chamber and space between the members, as disclosed in U.S. Pat. No. 2,948,268.

It is to be noted that a combination cover and fluid storage assembly means 76 is comprised of an exterior or cover plate 78 and a valve or pump plate 80 disposed axially intermediately between cover plate 78 and coupling member 44. The cover plate 78 and valve plate 80 cooperate to define a fluid storage chamber 82. Since the present invention is not concerned with the details of the fluid clutch arrangement, reference should be had to the Sutaruk U.S. Pat. No. 3,227,254 for operational details, which will be clearly apparent to persons skilled in the art, and it should suffice herein to say that means are described in that Patent for the temperature responsive means for regulating the volume of the fluid in the operating chamber during operation of the device.

When the engine is cold, a valve arm (not identified herein) is closed to prevent flow of fluid from the storage chamber 82 to the operating chamber and means create a positive pressure ahead of an impact pump such that a positive pumping of fluid from the operating chamber to the storage chamber takes place. This results in substantial evacuation of the operating chamber and low rotational speed of the fan with respect to the speed of the clutch input. However, as the temperature in the immediate vicinity of a helical wound bimetal thermostatic element increases due to the warmup of the engine, such thermostatic means functions in cooperation with a valve arm in a known way to uncover a greater portion of the inlet opening means such that the fluid is centrifuged from the storage chamber to the operating chamber, thus providing the means to increase the number of working lands and thereby causing the fan clutch slip speed to decrease.

The structure now to be described in greater detail relates specifically to our novel fan clutch lock, with FIG. 2 revealing in the context of a teaching similar to the Sutaruk patent, the components making this particular embodiment of our fan clutch lock operational.

In FIG. 2, we have shown an arrangement in which a boss 90 has been created as an extension of the shoulder portion 66, with such boss being drilled to receive a radially slidable pin 92, that is biased inwardly toward the shaft 30, such as by a compression spring 94. Note in this regard FIGS. 3a and 3b. Provided at one or preferably at a plurality of appropriate locations in the fan drive shaft 30 are comparatively shallow holes 96 designed to receive on occasion, the radially inward portion of the pin 92. As is obvious, when the pin 92 is out of contact with the shaft, the housing member 62 and the fan 6 may turn at whatever speed is appropriate for the engine operating condition that controls the slip between lands 50 and 74. On the other hand, when the radially slidable pin 92 is engaging a hole 96 in the shaft 30, the fan 6 will turn at a speed maximized insofar as engine speed is concerned in that no slip will occur between the shaft 30 and the shoulder portion 66, and thus provide the most fan cooling effect possible.

For balance reasons, we may use a pair of bosses 90 placed at diametrically opposite locations, as will be noted from FIG. 2, and optionally, we can use a pair of radially slidable pins, with the arrangement being such as shown in FIG. 2 in phantom lines.

Figure 3A:
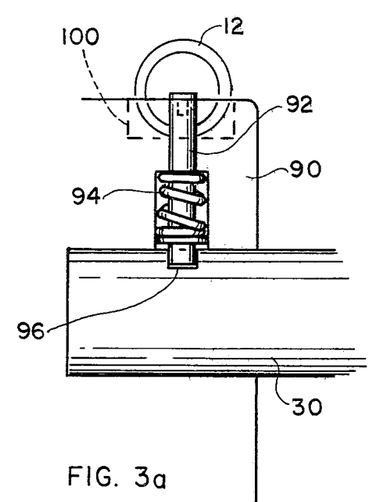
FIGS. 3a, 3b, and 3c are several related fragmentary views of an original-equipment version of our invention to a larger scale, illustrating how a user is able to obtain either the advantages of a thermostatically controlled fan, or else is able to quickly accomplish the locked condition in which maximum cooling effect by the fan is brought about.
Figure 3B:
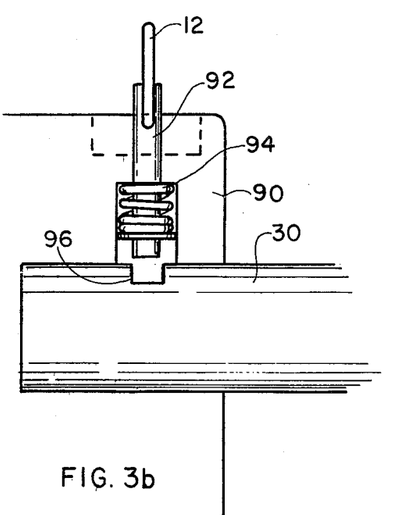
Figure 3C:
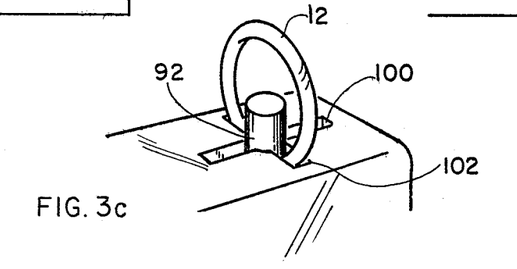

Turning to fragmentary FIGS. 3a, 3b and 3c, it will be noted in FIG. 3a that the pin has moved downwardly such that its lowermost portion is in contact with a hole 96, with the pin remaining in this radially inward position under the influence of spring 94. Removal of the pin 92 from the shaft-locking position shown in FIG. 3a is accomplished by the use of finger ring 12 provided at the upper end of pin 92, with such ring normally being able to be accomodated in a deep slot 100 that extends equally on each side of the hole in boss 90 in which the pin 92 is accomodated. When the user wishes to eliminate the locked shaft condition, he or she pulls upwardly on the ring 12, so as to overcome the heavy bias of spring 94, which causes the lower end of pin 92 to move out of contact with the hole 96 in the shaft 30. The user then rotates the pin ninety degrees such that the ring 98 will engage the shallow slot 102, which is illustrated in FIGS. 3b and 3c. In other words, when the ring is residing in the shallow slot 102, the lower end of the pin 92 is held out of contact with the fan drive shaft 30. As is obvious, when operating in this mode, the fan 12 turns at a speed determined by the fan speed controlling device described hereinbefore.

There are several alternate means for directly coupling the bosses 90 with shaft 30, such as providing a hole through the diameter of shaft 30 that mates with holes in the pair of bosses 90, and in one case provide a safety clip as the means for effecting engagement with the shaft 30; a second means can take the form of a bolt and nut; yet another means can be provided by having the hole in one of the bosses 90 threaded to receive a bolt placed in the companion boss.

Figure 4:
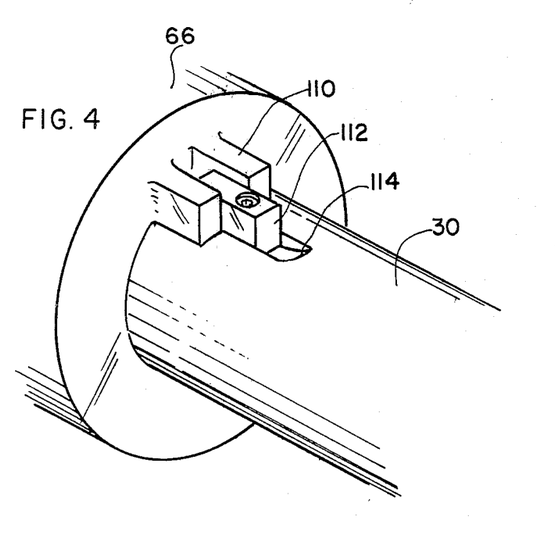
FIGS. 4 and 4a are related figures revealing another original equipment embodiment of our invention, wherein a key and keyway arrangement enable the fan to be selectively locked such that it turns with the fan mounting shaft.
Figure 4A:
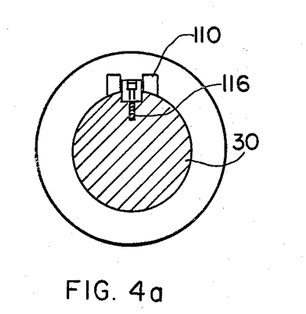

Turning to FIG. 4, it will be noted that we have there illustrated another embodiment of our fan shaft locking arrangement, in which a boss 110 is provided on the shoulder portion 66, with this boss being divided so as to accomodate a key 112 between its two halves. As shown in this figure and FIG. 4a, a slot 114 is provided in the shaft 30, in which the key 112 is disposed whenever a shaft lock is desired. As is apparent from FIG. 4, the key 112 is of a length to extend between the halves of boss 110, with the key being held in such location by virtue of a screw 116 whose threads engage complementary threads in the shaft 30. In this way, the key is prevented from flying out of its boss-engaging location under the influence of centrifugal force. As is obvious, the user can dispense with the locked shaft condition in accordance with this embodiment merely by removing the screw 116 and then lifting the key 112 out of its slot 114. An alternate method for securing the key is by using a clamp around the circumference of the driving shaft 30, and key 112.

Still another embodiment of the fan clutch lock is directed at retrofitting already existing and in use temperature responsive fan clutch assemblies. The preferred embodiment for the retrofit case is shown in FIG. 5.

Figure 5:
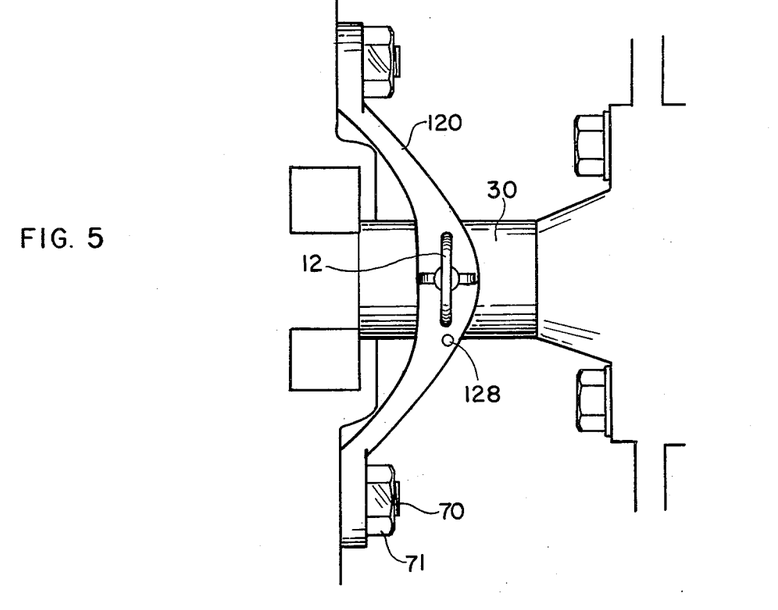
FIGS. 5, 5a and 5b are related views of a slidable pin embodiment of our invention that can be retrofitted to an existing fan arrangement of an auto or truck.
Figure 5A:
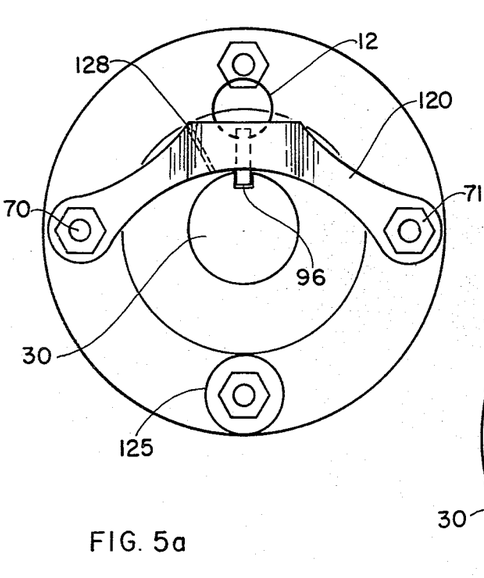

Turning to FIG. 5, it will be noted that we have shown an embodiment in which an elongate shaft locking member 120 is utilized, with this device being of sufficient dimension as to extend between a pair of studs 70 that are located 180 degrees apart. The holes in member 120 are slotted so as to provide a suitable fit between studs 70 that may vary in their separation distance from one clutch drive fan assembly to another. The preferred embodiment of providing the means to couple the shaft locking member 120 to shaft 30 is as shown in FIG. 5a, which is substantially identical to the locking pin arrangement shown in FIGS. 3a, 3b and 3c in that orthogonally placed shallow and deep slots for the ring 12 enable desired pin penetration depth to be easily established. Additionally, a washer 125 of suitable size is normally placed on the stud 70 on the opposite side of the drive shaft from shaft locking member 120 so as to maintain mass balance. Guide hole 128 provided in member 120 is radially aligned with respect to the center of shaft 30, and provides a means for obtaining the proper alignment when drilling one or more holes in shaft 30 to receive the radially slidable pin 92 or other pinning arrangements. In other words, this arrangement facilitates the proper retrofit installation of member 120, and assures alignment of the pin with its hole. Nuts 71 hold the member 120 in place.

Figure 5B:
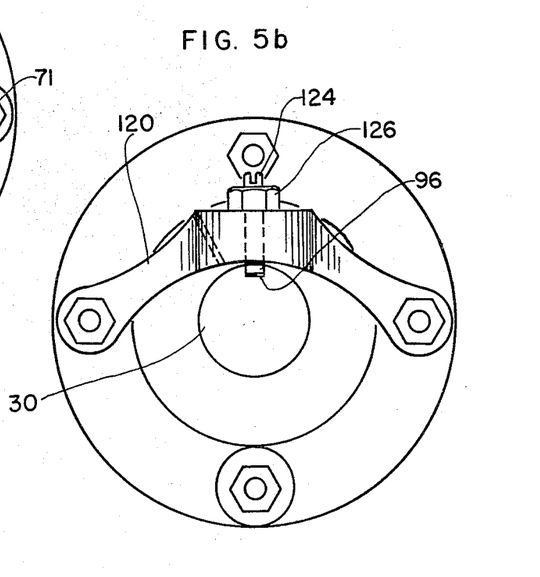

An alternate means to provide coupling between the shaft locking member 120 and shaft 30 is shown in FIG. 5b, with a short screw 124 being located in a tapped hole placed midway between the mounting holes of the bracket 120. A locknut 126 is used on the screw 124.

To bring about a locked shaft condition, the user loosens the nut 126 of FIG. 5b from direct contact with member 120, and then proceeds to tighten the screw 124 until such time as the radially inner portion of the screw engages hole 96 in shaft 30. At such time as the screw 124 has been tightened so as to achieve a shaft locking, the nut 126 is tightened so as to prevent unintentional loosening of the screw 124. An alternate means for the screw 124 and locking nut 126 can be provided in the form of a slotted head screw, hex head screw, or the like. Yet another means to provide selective engagement of member 120 with shaft 30 is by a force fit of screw 124 to the shaft 30.

Figure 6:
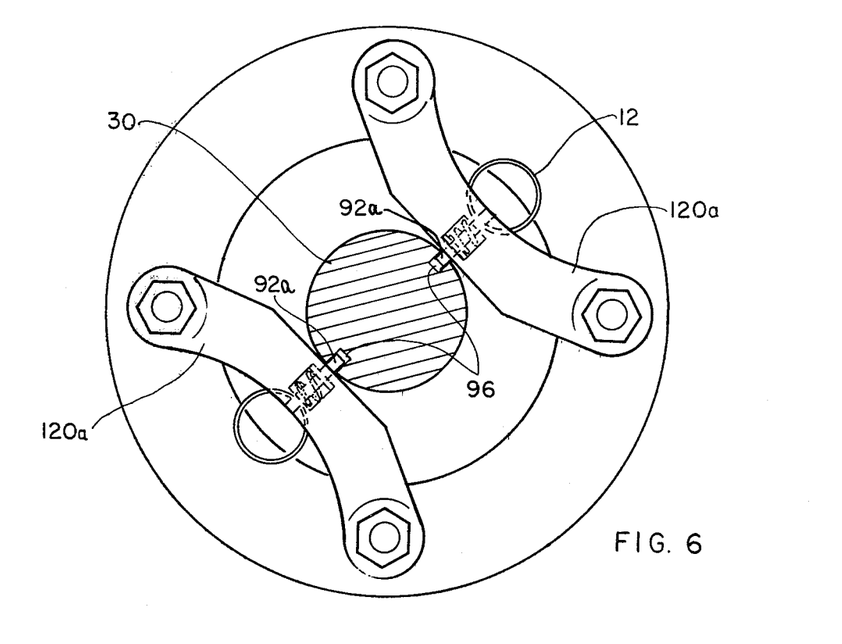
FIG. 6 is another embodiment of our device of the type that can be retrofitted to an existing automobile or truck fan, with a pair of radially-slidable pins being utilized in a balanced arrangement.

Referring now to FIG. 6, it will be seen that we have provided an embodiment of this invention generally along the lines of the teachings of FIGS. 5, 5a and 5b, except that in this figure, the elongate, somewhat U-shaped members 120a are used in pairs and are not mounted upon diametrically opposite studs in the manner illustrated in the preceding figure. Rather, the members 120a are typically mounted in each instance upon adjacent studs, with the central portion of these members being equipped with radially slidable pin arrangements of the type originally shown in FIGS. 3a and 3b.

As before, finger-engagable rings 12 are utilized so that the pins can be readily withdrawn from oppositely located holes 96 in the shaft 30 when it is desired to permit the fan rotation to be thermostatically controlled. Also as previously explained, when the rings are disposed in shallow slots, the pin 92a are held, against spring bias, in positions in which the lowermost ends of the pins are out of contact with the shaft 30, whereas, when the rings are in deep slots, the pins fit in respective holes and shaft locking is achieved.

Figure 7:
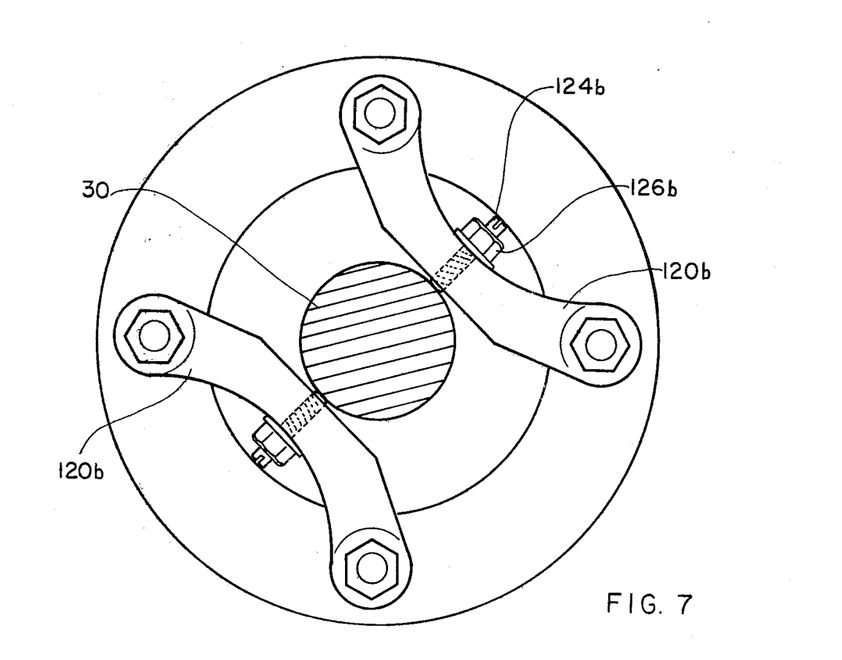
FIG. 7 is a view much like FIG. 6 but with locking screws rather than radially slidable pins being utilized in a balanced arrangement.

Turning to FIG. 7, an arrangement much like FIG. 6 is depicted, except that instead of having pins that are movable radially, we here use a pair of members 120b equipped with screws 124b at their mid-point location, which on occasion can be moved into force fit shaft-engaging positions. A locking nut 126b is utilized on each screw in order to prevent the unintentional loosening thereof. Alternate means for screws 124b include, slotted head machine screws, hex head bolts, or the like.

The embodiments of FIGS. 6 and 7 possess the advantage of being inherently balanced, so no washers or other counterbalance arrangements are necessitated.

There are several alternate ways to directly couple the locking shaft member(s) 120, 120a or 120b to the shaft 30, such as by providing a hole extending through the diameter of shaft 30 and in one case providing a safety clip as the means to effect engagement with the shaft 30. A second means can take the form of a bolt and nut, yet another means can be provided by threading the hole in one of the companion locking members 120a or b to receive a bolt.

Figure 8:
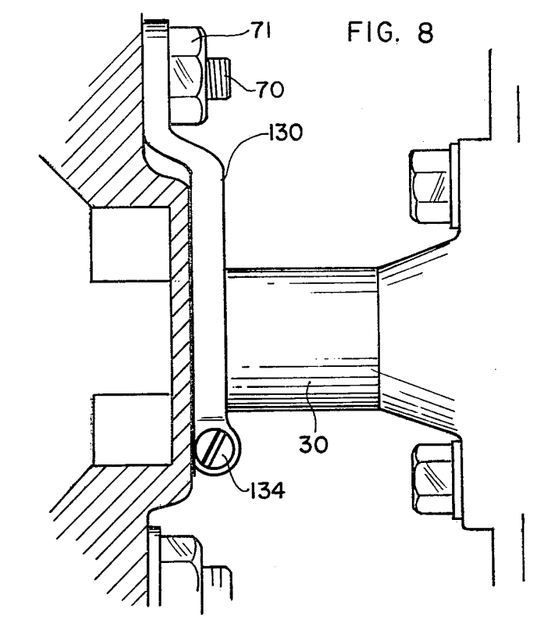
FIGS. 8 and 8a pertain to a retrofitted embodiment in which the user can bring about a selective clamping of the fan to the fan mounting shaft in order to bring about fan locking.
Figure 8A:
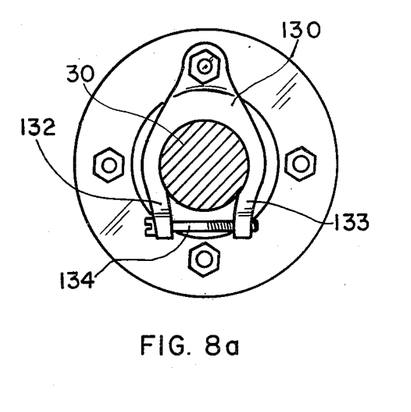

Turning to FIG. 8, it will be seen that we have there shown an embodiment in which a U-shaped member 130 disposed on a stud 70 and secured thereon by one of nuts 71 is located in shaft-surrounding relationship as best seen in FIG. 8a. Disposed at a position spanning between the ends of the arms 132 and 133 of the member 130 is a bolt 134, with the threaded end of the bolt being arranged to engage threads in the end of arm 133. As is obvious, upon tightening the bolt 134 by means of a screwdriver or other appropriate implement, the arms 132 and 133 are drawn tightly together about the shaft 30, such as to cause the shoulder 66 and the fan 6 to turn at the same speed as the shaft 30.

Figure 9:
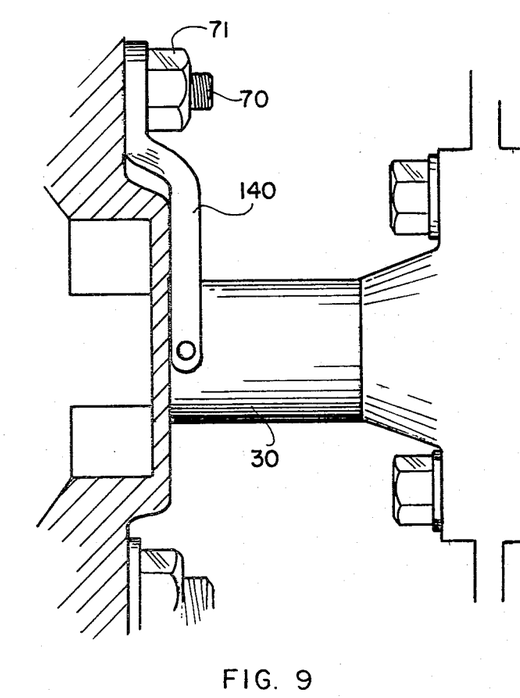
FIGS. 9 and 9a relate to a somewhat different retrofitted embodiment in which an elongate locking pin is utilized, which removably extends through the fan mounting shaft and the arms of a clevis-like member.
Figure 9A:
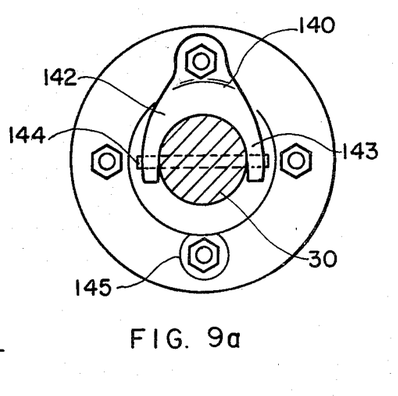

Turning to FIG. 9, it will be noted that we have shown another embodiment of a similar type, but in this instance the U-shaped member 140 has arms 142 and 143 whose ends are drilled so as to receive a pin 144 that extends entirely through the shaft so as to achieve a locking relationship. Pin 144 can be provided as a nut and bolt assembly; a stud bolt with mating threads in one arm hole; or the arms locked to the shaft by means of a safety pin. A washer 145 of suitable size may be provided on the stud opposite the mounting stud of member 140 in order to provide mass balance.

As should now be apparent, two basic applications of the selectively operable fan drive arrangement are taught herein. One is for the modification of existing designs, whereby at the vehicle operator's option, he can selectively circumvent the thermostatically controlled fan clutch. The obvious advantage to this application is that now automobile and truck manufacturers can use a thermostatically controlled fan clutch with this invention, where in the past they would have had to use a fixed drive fan clutch.

The second major application of this invention applies to retrofit of existing vehicles equipped with thermostatically controlled fan clutch. Application of this invention obviously extends the utility of a given vehicle and provides means for adequate engine cooling, whereas before the only alternative a vehicle owner had was to undertake the expense and inconvenience of physically exchanging the thermostatically controlled fan clutch for a fixed drive fan.

We claim:

1. A fan clutch lock for temporarily forcing the cooling fan associated with an internal combustion engine to turn without slippage, comprising a shaft member adapted to be driven to rotation, mounting means for mounting a fan to be turned by said shaft, said mounting means including a clutch arranged normally to permit a controlled amount of fan slippage as generally regulated by the engine operating temperature, with more fan slippage occurring at higher engine operating speeds, and selectively applied locking means for circumventing the fan clutch such that on engagement of said locking means, the fan rotates at the same speed as said shaft member at all engine operating speeds, said locking means being incorporated into a boss forming a permanent part of the fan mounting means, said boss being configured to receive a key that can form a connection between said boss, and a slot in said shaft.

2. A fan clutch lock for temporarily forcing a cooling fan fluid clutch associated with an internal combustion engine to turn without slippage, comprising a shaft member adapted to be driven in rotation, mounting means for mounting a fan to be turned by said shaft member, said mounting means including a fluid clutch arranged normally to permit a controlled amount of fan slippage as generally regulated by the engine operating temperature, with more fan slippage occurring at higher engine operating speeds, and selectively applied locking means within a portion of said mounting means, and adjacent said shaft member, and on occasion extending into locking relationship with said shaft member, for circumventing the fan fluid clutch such that on engagement of said locking means, the fan rotates at the same speed as said shaft member at all engine operating speeds.

3. The fan clutch lock as defined in claim 2 wherein said locking means is a bracket equipped with clamping means adapted to apply circumferential pressure to said shaft.

4. The clutch lock as defined in claim 2 wherein said locking means is a bracket having arms that straddle said shaft, said arms and said shaft having holes that can be brought into alignment on occasion, so that an elongate locking device can be inserted therethrough.

5. The fan clutch lock as defined in claim 2 wherein said locking means is incorporated into a boss forming a permanent part of the fan mounting means.

6. The fan clutch lock as defined in claim 5 in which said locking means involves at least one radially slidable pin.

7. The fan clutch lock as defined in claim 5 in which said locking means involves at least a pair of radially slidable pins circumferentially spaced in a balanced arrangement.

8. The fan clutch lock as defined in claim 5 in which said boss has a threaded hole in which is threadedly disposed a screw that can be tightened against said shaft in order to cause said fan to turn at the same rate of speed as the shaft.

9. The fan clutch lock as defined in claim 2 in which said locking means is a bracket attached to said mounting means, said bracket utilizing a member arranged to make firm contact with said shaft member on occasion.

10. The fan clutch lock as defined in claim 9 wherein the member utilized on said bracket is a screw adapted to be forced into driving contact with said shaft.

11. The fan clutch lock as defined in claim 9 wherein the member utilized on said bracket is a radially movable locking pin adapted to be received in a hole in said shaft.

12. The fan clutch lock as defined in claim 9 wherein said locking means involves the use of a pair of brackets employed in a rotationally balanced arrangement, with means utilized on each of said brackets for making contact with said shaft on occasion.

13. The fan clutch lock as defined in claim 12 in which the means utilized on each of said brackets for making firm shaft contact is a spring biased, radially-slidable pin.

14. The fan clutch lock as defined in claim 12 in which the means utilized on each of said brackets for making firm shaft contact is a screw.

* * * * *